(12) United States Patent
Shinoda (10) Patent No.: US 8,812,219 B2
(45) Date of Patent: Aug. 19, 2014

(54) CONTROL APPARATUS FOR INTERNAL COMBUSTION ENGINE

(75) Inventor: Yoshihisa Shinoda, Susono (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 510 days.

(21) Appl. No.: 13/126,107

(22) PCT Filed: Mar. 9, 2010

(86) PCT No.: PCT/JP2010/053868
§ 371 (c)(1),
(2), (4) Date: Apr. 26, 2011

(87) PCT Pub. No.: WO2011/111163
PCT Pub. Date: Sep. 15, 2011

(65) Prior Publication Data
US 2012/0029788 A1     Feb. 2, 2012

(51) Int. Cl.
*B60T 7/12*    (2006.01)
*G05D 1/00*    (2006.01)
*G06F 7/00*    (2006.01)
*G06F 17/00*   (2006.01)
*F02B 13/00*   (2006.01)

(52) U.S. Cl.
USPC .......................................... 701/107; 123/575

(58) Field of Classification Search
CPC ..... F02D 19/06; F02D 19/0623; F02B 43/10; Y02T 10/30; Y02T 10/32; Y02T 10/36
USPC ..... 123/1 A, 575–577, 198 A, 198 D, 27 GE, 123/431, 525; 701/103, 107
See application file for complete search history.

(56) References Cited

U.S. PATENT DOCUMENTS

| | | | |
|---|---|---|---|
| 7,179,199 B2 * | 2/2007 | Kushiyama et al. | 477/181 |
| 7,610,896 B2 * | 11/2009 | Kakuho et al. | 123/304 |
| 2005/0130797 A1 * | 6/2005 | Kushiyama et al. | 477/110 |
| 2008/0221778 A1 * | 9/2008 | Kakuho et al. | 701/103 |
| 2009/0260419 A1 * | 10/2009 | Maeda et al. | 73/23.32 |
| 2009/0314071 A1 * | 12/2009 | Mukai | 73/114.38 |

FOREIGN PATENT DOCUMENTS

| | | |
|---|---|---|
| JP | 6-264800 A | 9/1994 |
| JP | 10-018902 A | 1/1998 |
| JP | 2000-257498 A | 9/2000 |
| JP | 2003-120386 A | 4/2003 |
| JP | 2005-178445 A | 7/2005 |
| JP | 2006-266160 A | 10/2006 |
| JP | 2007-100709 A | 4/2007 |
| JP | 2008-31915 A | 2/2008 |
| JP | 2009-257245 A | 11/2009 |
| JP | 2009-264151 A | 11/2009 |
| JP | 2010-025102 A | 2/2010 |

\* cited by examiner

*Primary Examiner* — Mahmoud Gimie
*Assistant Examiner* — Sizo Vilakazi
(74) *Attorney, Agent, or Firm* — Sughrue Mion, PLLC (57) ABSTRACT

The present invention provides a control apparatus used in an internal combustion engine that can switchably use a compressed natural gas and gasoline. The control apparatus carries out a miss fire check on the internal combustion engine over two or more combustion cycles, and, based on the results of the check, detects failures. The control apparatus prohibits switching of fuels (S23, S24, S28) basically during the miss fire check. If the value of a miss fire counter is not increasing, the control apparatus predicts that a negative check result will not be obtained (S26), and lifts the prohibition on switching of fuels (S29).

6 Claims, 5 Drawing Sheets

CONTROL APPARATUS FOR INTERNAL COMBUSTION ENGINE

CROSS REFERENCE TO RELATED APPLICATIONS

This is a National Stage of International Application No. PCT/JP2010/053868 filed Mar. 9, 2010, the contents of all of which are incorporated herein by reference in their entirety.

TECHNICAL FIELD

The present invention generally relates to an internal-combustion engine control apparatus used in an internal combustion engine that can switchably use two or more kinds of fuels.

BACKGROUND ART

There have been widely known internal combustion engines that can switchably use two or more kinds of fuels according to the situation, and widely known internal combustion engines that can change the blend ratio between fuels. As a control apparatus for such an internal combustion engine, there has been a known apparatus that detects an inappropriate combustion state with a sensor, and changes the blend ratio or the ignition timing of fuels so that the inappropriate combustion state changes to an appropriate combustion state (Patent Literature 1). Also, as an internal combustion engine that switchably uses two or more kinds of fuels, there has been a known engine that switches the fuel being used to a fuel with a smaller amount of air pollutants when determining that the air pollutants in the exhaust is likely to become higher in density (Patent Literature 2).

CITATION LIST

Patent Literatures

Patent Literature 1: JP-A-2003-120386
Patent Literature 2: JP-A-2006-266160

SUMMARY OF INVENTION

Technical Problem

The inappropriate combustion state detected by the control apparatus according to Patent Literature 1 is a type of failure in an internal combustion engine. Detecting various failures in an internal combustion engine is necessary to ensure safety. If fuels are switched to recover a normal state while a check is being carried out to detect such failures, the fact that a failure has occurred while a certain fuel is being used cannot be accurately recognized. For example, in a case where there is a need to check for failures with respect to each fuel used in an internal combustion engine that switches fuels, the accuracy of checks cannot be ensured if fuels in use are inappropriately switched during the check. As a result, the reliability of failure diagnoses to be carried out based on the results of the check is degraded.

In view of the above circumstances, the present invention aims to provide an internal combustion engine control apparatus that can ensure the reliability of failure diagnoses to be carried out on an internal combustion engine that can switchably use two or more kinds of fuels.

Solution to Problem

A first control apparatus of the present invention is a control apparatus for an internal combustion engine, the control apparatus being used in the internal combustion engine that is capable of switchably using a plurality of kinds of fuels, and the control apparatus includes: a checking device that carries out a check on the internal combustion engine over a plurality of combustion cycles; a failure diagnosing device that detects a failure, based on a result of the check carried out by the checking device; and a fuel switch prohibiting device that controls the internal combustion engine so that switching of fuels is prohibited after a start of the check.

In the first control apparatus, switching of fuels is prohibited at the start of the check to be carried out over two or more combustion cycles of the internal combustion engine. With this arrangement, the check can be prevented from becoming inaccurate due to switching of fuels during the check, and an ill-timed suspension of the check can be prevented. Accordingly, an appropriate check can be carried out with respect to each fuel in use, and the reliability of failure diagnoses can be ensured.

In one aspect of the first control apparatus, the control apparatus further includes a check result predicting device that predicts whether a negative check result to be diagnosed as the failure by the failure diagnosing device will be obtained, based on a progress status of the check, after the start of the check, and the fuel switch prohibiting device may control the internal combustion engine so that the prohibition on switching of fuels is lifted when the check result predicting device predicts that the negative check result will not be obtained after the start of the check. When it is possible to predict a negative check result to be diagnosed as a failure will not be obtained, the reliability of failure diagnoses is not degraded even if the check is suspended due to switching of fuels. According to this aspect, only when it is possible to predict that a negative check result will not be obtained, the prohibition on switching of fuels is lifted during the check. Therefore, even if a request for switching of fuels is issued to the internal combustion engine after the start of the check, the request is not totally ignored to complete the check. In this manner, some fuel switch requests can be satisfied while the reliability of failure diagnoses is ensured. Thus, the utility of the internal combustion engine can be enhanced.

When a prediction is made about whether a failure will be detected, the contents of the check to be carried out by the checking device and the contents of the diagnosis to be carried out by the failure diagnosing device can be taken into consideration. For example, the checking device obtains a plurality of physical quantities related to failures to be checked for over the plurality of combustion cycles, and determines each of the obtained physical quantities to be a normal value or an abnormal value, the failure diagnosing device detects the failure when the number of the abnormal values determined by the checking device exceeds an allowable range, and after the start of the check, the check result predicting device predicts whether the negative check result will be obtained, based on a variation of the number of the abnormal values within the allowable range. When the number of abnormal values exceeds the allowable range, the failure diagnosing device detects a failure. Accordingly, by examining the variation of the number of abnormal values within the allowable range, a prediction can be made about whether the number of abnormal values will stay within the allowable range if the check is continued.

For example, after the start of the check, the check result predicting device may predict that the negative check result will not be obtained, when the number of the abnormal values stays within the allowable range and is not increasing. Where the number of abnormal values is not increasing, the number of abnormal values can hardly exceed the allowable range even if the check is continued thereafter. Therefore, in such a case, it is possible to predict that a negative check result will not be obtained. It should be noted that an "increase" means an increase in the number of abnormal values determined at predetermined intervals (at predetermined time intervals or crank-angle intervals) in this operation, compared with the number of abnormal values determined previous time.

In one aspect of the first control apparatus, after the start of the check, the fuel switch prohibiting device may control the internal combustion engine so that the prohibition on switching of fuels is lifted when the check is finished. According to this aspect, once the check is started, switching of fuels is prohibited until the check is finished. Accordingly, the check can be certainly completed, and an accurate check result can be obtained.

In one aspect of the first control apparatus, after the start of the check, the fuel switch prohibiting device may control the internal combustion engine so that the prohibition on switching of fuels is lifted when a period of time or combustion cycles in which the check can be completed has passed or have ended. In many cases, the checking period of a check to be carried out on an internal combustion engine is set in terms of time or combustion cycles (a crank angle). The timing to lift the prohibition on switching of fuels is set in terms of the time or combustion cycles in which the check can be completed. In this manner, lifting the prohibition on switching of fuels during the check can be readily prevented, even if the end of the check is not directly detected.

Checks to be carried out on an internal combustion engine may include any kinds of checks, as long as those checks are to be carried out over two or more combustion cycles. For example, the checking device can carry out the check that is a miss fire check on the internal combustion engine over a plurality of combustion cycles, and the failure diagnosing device can detect the failure that is a combustion failure due to a miss fire. Other than that, checks to be carried out according to the present invention include the following checks: an imbalance check for checking for abnormal variations of combustion states of the respective cylinders in a multicylinder internal combustion engine; a check for deterioration of an exhaust purification catalyst provided in an exhaust pathway of an internal combustion engine; and a check for failures in an air-fuel ratio sensor mounted in an internal combustion engine. Each of those checks is a known check that is carried out over two or more combustion cycles, and the result of each of those checks might be affected by switching of fuels.

Any kinds of fuels may be used as the fuels used switchably in the internal combustion engine. For example, as the plurality of kinds of fuels, a hydrocarbon gas fuel and a hydrocarbon liquid fuel may be included. A typical hydrocarbon gas fuel is a compressed natural gas, and other gas fuels include LP gas and the like. Hydrocarbon liquid fuels include gasoline, light oil, alcohol, and a blended fuel of gasoline and alcohol.

In the case of the internal combustion engine that switchably uses the hydrocarbon gas fuel and an hydrocarbon liquid fuel, the fuel switch prohibiting device may vary conditions for lifting the prohibition on switching of fuels between switching from the hydrocarbon gas fuel to the hydrocarbon liquid fuel and switching from the hydrocarbon liquid fuel to the hydrocarbon gas fuel. Where fuels with different properties from each other are used, the conditions of use and the frequencies of use also vary. If the conditions for lifting a prohibition on switching are uniformly defined, a request for switching to a certain fuel often remains unsatisfied, and excessive limitations might be put on switching to the certain fuel. According to this aspect, by varying the conditions for lifting the prohibition between the fuel switch directions, various conditions for each fuel such as the conditions of use and the frequencies of use can be taken into considered in putting limitations on switching of fuels.

A second control apparatus of the present invention is a control apparatus for an internal combustion engine, the control apparatus being used in the internal combustion engine that is capable of switchably using two kinds of fuels in such a manner that frequencies of use of the two kinds of fuels differ from each other, the control apparatus includes: a checking device that carries out a check on the internal combustion engine over a plurality of combustion cycles; a failure diagnosing device that detects a failure, based on a result of the check carried out by the checking device; and a fuel switch prohibiting device that controls the internal combustion engine so that switching of fuels from a fuel with a low frequency of use to a fuel with a high frequency of use is prohibited after a start of the check, when the check is started while the fuel with the low frequency of use is being used.

Where there is a difference between the frequencies of use of two different kinds of fuels, there is a probability that the check cannot be thoroughly carried out, since the check is carried out less frequently while the fuel with the lower frequency of use is being used, even if the check is thoroughly carried out while the fuel with the higher frequency of use is being used. In the second control apparatus, switching to the fuel with the higher frequency of use is prohibited when the check is started while the fuel with the lower frequency of use is being used. Accordingly, the check can be prevented from becoming inaccurate while the fuel with the lower frequency of use is being used, and an ill-timed suspension of the check can be prevented. Thus, the check can be appropriately carried out while the fuel with the lower frequency of use is being used, and the reliability of failure diagnoses can be ensured.

In one aspect of the second control apparatus, a check result predicting device that predicts whether a negative check result to be diagnosed as the failure by the failure diagnosing device will be obtained, based on a progress status of the check, after the start of the check, and the fuel switch prohibiting device may control the internal combustion engine so that the prohibition on switching of fuels is lifted when the check result predicting device predicts that the negative check result will not be obtained after the start of the check. According to this aspect, switching to the fuel with the higher frequency of use is limited so that the reliability of failure diagnoses can be ensured while the fuel with the lower frequency of use is being used. Accordingly, excessive limitations are not put on requests for switching to the fuel with the higher frequency of use, and the utility of the internal combustion engine is not degraded.

It should be noted that the frequency of use of a fuel indicates how often the fuel is used where an internal combustion engine in which a control apparatus according to the present invention is used is operated under standard conditions while there are enough amounts of respective fuels. An example of the frequency of use of a fuel is the frequency of use of a fuel used in a case where a vehicle on which the internal combustion engine is mounted is driven in a travel mode used in a fuel consumption test.

DESCRIPTION OF EMBODIMENTS

First Embodiment

Figure 1:
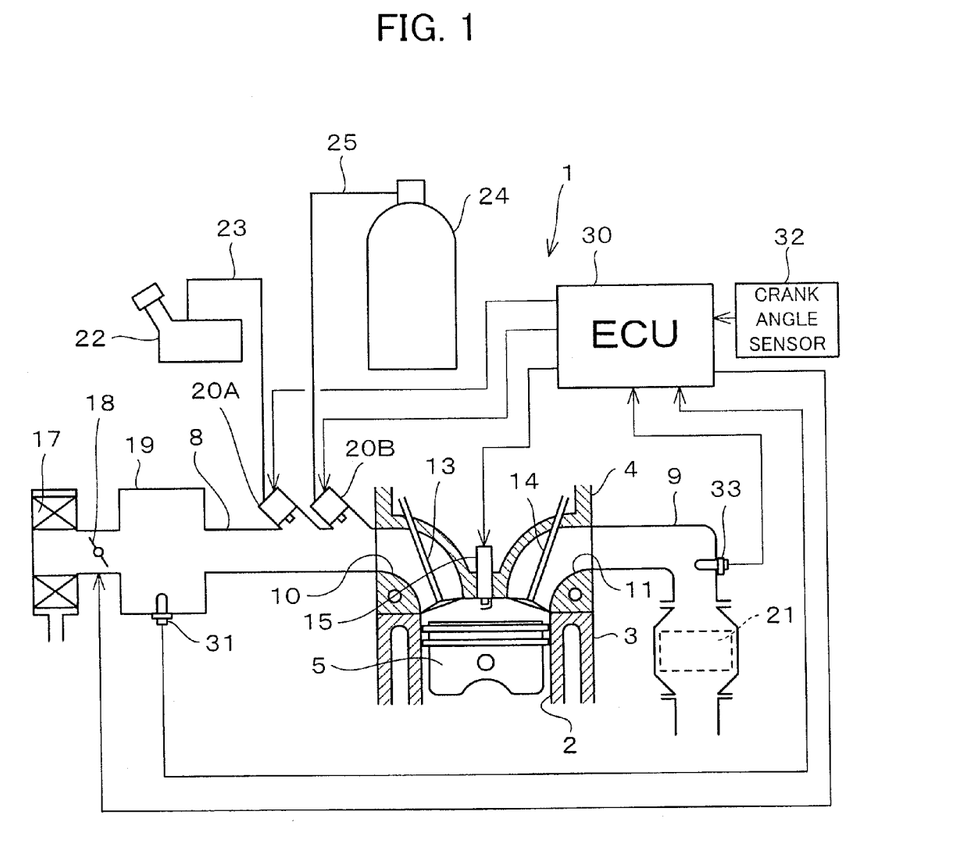
FIG. 1 is a diagram showing the relevant parts of an internal combustion engine for which a control apparatus according to a first embodiment is used.

FIG. 1 shows the relevant parts of an internal combustion engine to which a control apparatus according to a first embodiment of the present invention is applied. The internal combustion engine 1 is designed as a four-cylinder, spark-ignited internal combustion engine that includes four cylinders (one of them is shown in FIG. 1) 2. The internal combustion engine 1 can be mounted as a source of power for running on a vehicle. The internal combustion engine 1 is a four-stroke, one-cycle internal combustion engine that performs each one combustion cycle of the four-stroke of intake stroke, compression stroke, power stroke, and exhaust stroke. The internal combustion engine 1 is also designed as a bi-fuel engine that can use two or more kinds of fuels. The internal combustion engine 1 can use a compressed natural gas (CNG) as the hydrocarbon gas fuel and gasoline as the hydrocarbon liquid fuel.

The internal combustion engine 1 includes a cylinder block 3 having the cylinders 2 formed therein, a cylinder head 4 attached to the cylinder block 3 so as to block the openings of the respective cylinders 2, and a piston 5 that is reciprocably placed in each cylinder 2. An intake passage 8 and an exhaust passage 9 are connected to each cylinder 2. The intake passage 8 has an intake port 10 that is formed in the cylinder head 4 and is open toward the cylinder 2. The exhaust passage 9 has an exhaust port 11 that is formed in the cylinder head 4 and is open toward the cylinder 2. The intake port 10 is opened and closed by an intake valve 13, and the exhaust port 11 is opened and closed by an exhaust valve 14. A spark plug 15 that ignites a blended fuel gas filling each cylinder 2 is placed on the cylinder 2, with the top end portion thereof facing the inside of the cylinder 2.

An air cleaner 17 that filters intake air, a throttle valve 18 that adjusts the amount of intake air, a surge tank 19 that alleviates pulsing motion of intake air, and two kinds of fuel injectors 20A and 20B that inject fuels into the intake passage 8 are placed in the intake passage 8. In the exhaust passage 9, a three-way catalyst 21 is provided as an exhaust purifying device to purify the harmful substance in exhaust.

The first fuel injector 20A is connected to a fuel tank 22 via a liquid fuel passage 23. A fuel pump (not shown) for pumping gasoline held in the fuel tank 22 into the first fuel injector 20A is provided in the liquid fuel passage 23. The second fuel injector 20B is connected to a fuel bottle 24 via a gas fuel passage 25. The fuel bottle 24 is filled with a CNG in a pressurized state. Each of the fuel injectors 20A and 20B is designed as an electromagnetically-driven fuel injector, and operations of the respective fuel injectors 20A and 20B are controlled by an engine control unit (ECU) 30.

The ECU 30 is designed as a computer for properly controlling the internal combustion engine 1. Although not shown in the drawings, the ECU 30 includes a microprocessor as a main arithmetic device, and storage devices such as a ROM and a RAM, input/output ports, and the like required in operations of the microprocessor. The ECU 30 controls the injection quantity and controls switching of fuels through operations of the respective fuel injectors 20A and 20B. The ECU 30 also controls the ignition timing through an operation of the spark plug 15, and controls operations of the throttle valve 18 in accordance with the accelerator opening. To perform various control operations in the internal combustion engine 1, the ECU 30 receives information from a number of sensors. For example, the ECU 30 is connected to an air flow meter 31 that outputs a signal in accordance with the amount of intake air, a crank angle sensor 32 that outputs a signal in accordance with the number of rotations (the rotation speed) of the internal combustion engine 1, and an oxygen density sensor 33 that outputs a signal in accordance with the air-fuel ratio.

Although the ECU 30 performs various kinds of control operations, only the control operations according to the present invention are described herein, and the control operations that are not highly relevant to the present invention are not described herein. The ECU 30 switches the fuel being used between a CNG and gasoline, in response to a fuel switch request. Based on various kinds of criteria, the fuel switch request is logically generated in the ECU 30. For example, where the three-way catalyst 21 has not been activated, a request to switch the fuel being used to CNG having a smaller amount of emission of harmful components is generated based on emission efficiency criteria. After the three-way catalyst 21 is activated, a request to switch from CNG to gasoline is generated. Also, a switch request to preferentially use gasoline is generated based on fuel reduction criteria or request output power criteria. In some cases, a switch request according to the remaining amount of each fuel may also be generated. At the same time as the switching of fuels being used, the ECU 30 switches control operations such as the fuel injection quantity control operation and the ignition timing control operation, so that appropriate combustion is performed in accordance with the characteristics of each fuel.

To ensure the safety, the ECU 30 also functions as an on-board diagnostic (OBD) system that diagnoses various kinds of failures in the internal combustion engine 1 and reports them to users such as drivers. Although the ECU 30 diagnoses various failures, the failures to be diagnosed according to the present invention include combustion failures caused by miss fires, and combustion failures caused by variations in the combustion states of the respective cylinders 2. The failures to be diagnosed other than the combustion failures include failures in auxiliary machines such as degradation of the three-way catalyst 21 and a failure of the oxygen density sensor 33. As already known, those diagnoses are made based on predetermined checks carried out over two or more combustion cycles.

The specifics of those checks are now described through a miss fire check. In a case of a miss fire check, the angular velocity (the rotation speed) at each predetermined crank angle is detected by analyzing an output signal of the crank angle sensor 32. The angular velocities vary with the order of combustions of the respective cylinders 2. Therefore, the upper-limit peak values of those sequentially-detected angular velocities are extracted, and the differences between adjacent ones of the peak values are obtained as the physical quantities related to the failure to be checked for. A normal value and an abnormal value are determined by carrying out a check to determine whether those differences exceed a limit value defining the limit of a miss fire. In the miss fire check, the above described series of procedures is repeatedly carried out over a predetermined number of combustion cycles.

Figure 2:
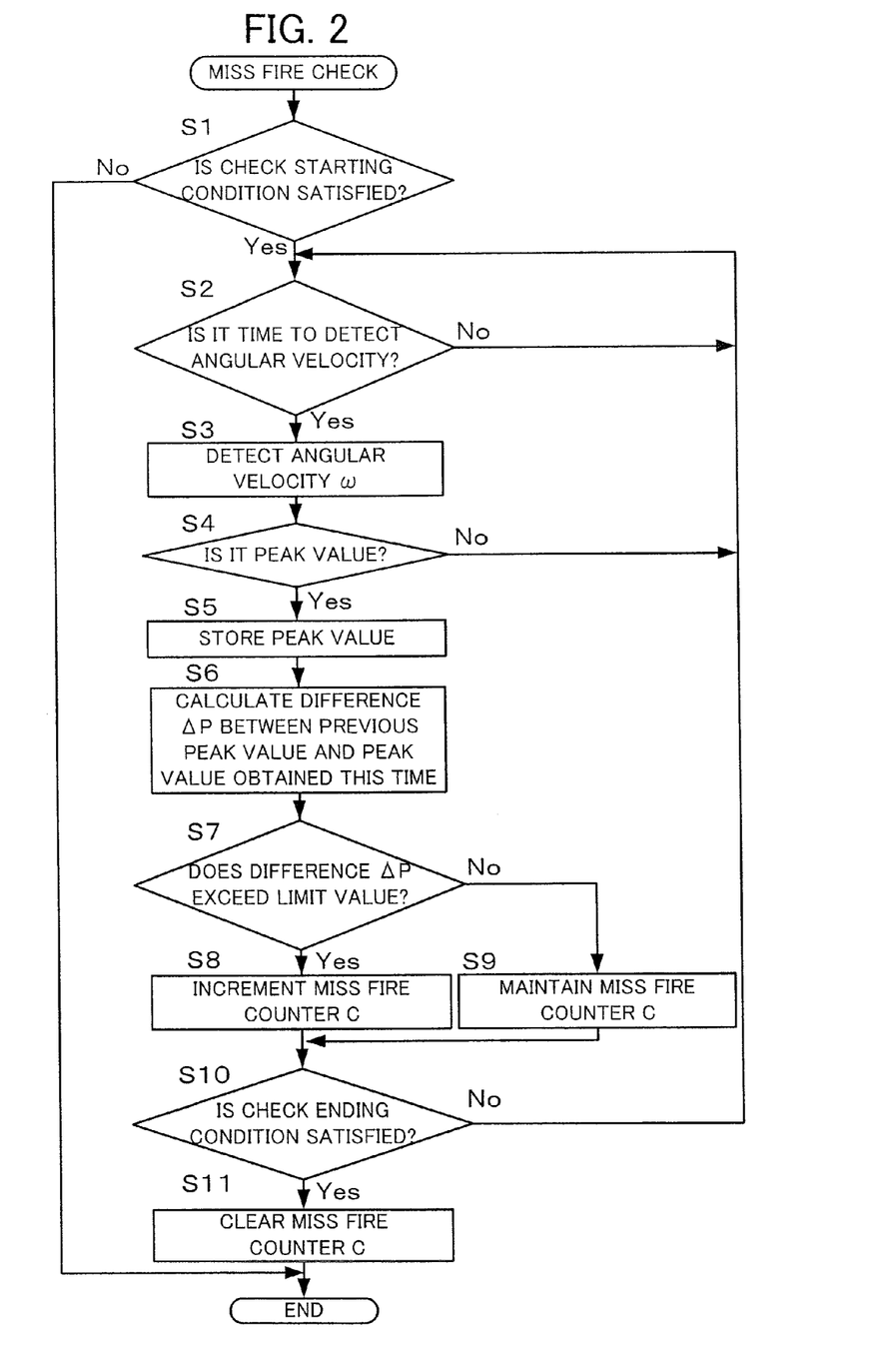
FIG. 2 is a flowchart showing a miss fire checking routine.

FIG. 2 is a flowchart showing the routine of the miss fire check operation to be performed by the ECU 30 as a specific example of the above described miss fire check. The program of this routine is read out in the ECU 30 when needed, and is repeatedly executed at predetermined intervals. In this manner, the ECU 30 functions as the checking device according to the present invention.

First, in step S1, the ECU 30 determines whether the condition for starting a miss fire check is satisfied. The check starting condition is set so that appropriate check frequency is ensured. For example, a cumulative running time exceeding a predetermined value may be set as the check starting condition. If the check starting condition is satisfied, the ECU 30 moves on to step S2. If the check starting condition is not satisfied, the procedures to follow are skipped, and this routine comes to an end.

In step S2, the ECU 30 determines whether the time to detect the angular velocity has come, based on the output signal of the crank angle sensor 32. The timing of detection is set for each predetermined angle, so that the angular velocity can be detected every 30 degrees of crank angle, for example. If the timing of detection has come, the ECU 30 moves on to step S3. If the timing of detection has not come, the operation awaits for the procedure. In step S3, the angular velocity is detected by analyzing the output signal of the crank angle sensor 32. In step S4, the ECU 30 determines whether the angular velocity detected in step S3 is a peak value on the upper limit side. If the detected angular velocity is a peak value, the ECU 30 moves on to step S5, and the peak value is stored. If the detected angular velocity is not a peak value, the ECU 30 returns to step S2.

In step S6, the difference ΔP between the peak value obtained in the previous operation and the peak value obtained in this operation is calculated. In step S7, the ECU 30 determines whether the difference ΔP exceeds the limit value defining the limit of a miss fire. If the difference ΔP exceeds the limit value, a miss fire is considered to have occurred, and the difference ΔP is regarded as an abnormal value. Specifically, a preset miss fire counter C is incremented in step S8. The miss fire counter C is a variable stored in the ECU 30. If the difference ΔP does not exceed the limit value, a miss fire is considered not to have occurred, and therefore, the difference ΔP is regarded as a normal value. That is, the value of the miss fire counter C is maintained.

In step S10, the ECU 30 determines whether the condition for ending the miss fire check is satisfied. The check ending condition is set so that a predetermined checking period over two or more combustion cycles is ensured. For example, the check ending condition may be that a predetermined number of combustion cycles or a predetermined number of rotations (to be specific, 1000 rotations after the start of the check or the like) has ended since the start of the check. If the check ending condition is not satisfied, the ECU 30 returns to step S2 to continue the check. If the check ending condition is satisfied, the ECU 30 moves on to step S11. The miss fire counter C is then cleared, and this routine comes to an end.

As the above miss fire check is carried out by the ECU 30, occurrences of miss fires can be recognized. The ECU 30 determines that a failure has occurred when the number of abnormal values, namely the value of the miss fire counter C, obtained as the results of the miss fire check exceeds an allowable range. As for checks and diagnoses other than miss fire check, the ECU 30 obtains physical quantities related to failures to be checked for over two or more combustion cycles, and carries out checks to determine an abnormal value or a normal value for each of the obtained physical quantities. The ECU 30 then determines whether each of the failures exists, based on whether the number of abnormal values obtained as the results of each check exceeds an allowable range, as in the miss fire check.

Since the checks lasting over two or more combustion cycles like the above described miss fire check are closely related to the operating state of the internal combustion engine 1, there is a high probability that switching of fuels being used during a check affects the results of the check as the operating state of the internal combustion engine 1 changes when the fuels being used are switched during a check. Therefore, the ECU 30 puts limitations on switching of fuels during the above described respective checks, so as to ensure reliability of failure diagnoses.

Figure 3:
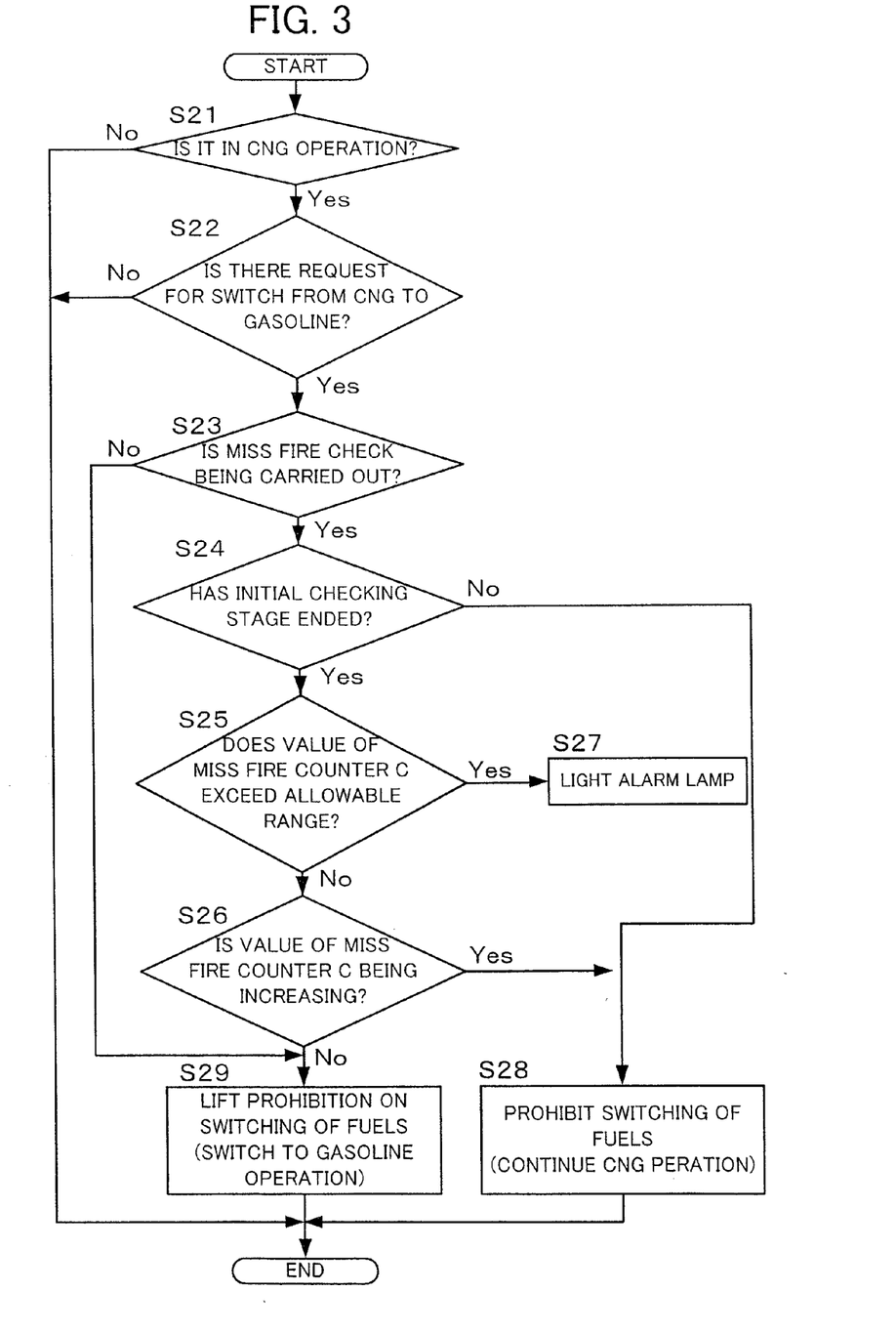
FIG. 3 is a flowchart showing an example of a control routine according to the first embodiment.

FIG. 3 is a flowchart showing an example of a control routine according to the first embodiment. The program of this control routine is stored in the ECU 30. The program is read out when needed, and is repeatedly executed at predetermined intervals. In this manner, the ECU 30 functions as the fuel switch prohibiting device according to the present invention. The control routine of FIG. 3 concerns a fuel switch from CNG to gasoline. In a case where the fuel is switched from gasoline to CNG as opposed to the case shown in FIG. 3, or where any of the above described respective checks other than the miss fire check is carried out, the same control operation as that shown in FIG. 3 is also performed. However, for ease of explanation, the description is focused on the case shown in FIG. 3.

In step S21, the ECU 30 determines whether the internal combustion engine 1 is operating with the use of CNG or is in a CNG operation. If the internal combustion engine 1 is in the CNG operation, the ECU 30 moves on to step S22. If the internal combustion engine 1 is not in the CNG operation, this routine comes to an end. In step S22, the ECU 30 determines whether there is a switch request to switch the fuel being used from CNG to gasoline. If there is the switch request, the ECU 30 moves on to step S23. If there is not the switch request, the procedures to follow are skipped, and this routine comes to an end.

In step S23, the ECU 30 determines whether the miss fire check (see FIG. 2) is being carried out on the internal combustion engine 1, or whether the miss fire check has not been started yet or has been finished. If the miss fire check is being carried out, the ECU 30 moves on to step S24. If the miss fire check is not being carried out, the ECU 30 moves on to step S29. In step S24, the ECU 30 determines whether an initial checking stage has ended since the start of the miss fire check. The initial checking stage is the stage where a normal value or an abnormal value is detected through the procedures of steps S7 through S9 of FIG. 2, and a check result can be predicted. If the initial checking stage has ended, the ECU 30 moves on to step S25. If the initial checking stage has not ended yet, the ECU 30 moves on to step S28, and the internal combustion engine 1 is controlled so that a fuel switch from CNG to gasoline is prohibited. That is, the internal combustion engine 1 is continued to perform the CNG operation. The switching of fuels is always prohibited after the start of the miss fire check to the end of the initial checking stage.

In step S25, the ECU 30 determines whether the value of the miss fire counter C exceeds the allowable range. This allowable range is a range in which the combustion state can be regarded as normal. Therefore, if the value of the miss fire counter C exceeds the allowable range, a combustion failure due to a miss fire is considered to have occurred. Therefore, the ECU 30 moves on to step S27, and an alarm lamp is lighted to notify users of the occurrence of the failure. By carrying out the determination procedure of step S25, the ECU 30 functions as the failure diagnosing device according to the present invention. If the value of the miss fire counter C does not exceed the allowable range, the ECU 30 moves on to step S26.

In step S26, the ECU 30 determines whether the value of the miss fire counter C is increasing, to predict the check result of the check being currently carried out. As described above, a failure is detected when the value of the miss fire counter C exceeds the allowable range in step S25. Therefore, by examining the variation of the value of the miss fire counter C while the value of the miss fire counter C stays within the allowable range, the ECU 30 can predict whether the value of the miss fire counter C will stay within the allowable range if the ECU 30 continues the check. Where the value of the miss fire counter C is increasing, there is a probability that the value of the miss fire counter C will exceed the allowable range if the check is continued. Where the value of the miss fire counter C is not increasing, on the other hand, the value of the miss fire counter C can hardly exceed the allowable range even if the check is continued thereafter, as long as the value of the miss fire counter C is constant in this embodiment. In other words, where the value of the miss fire counter C is not increasing, it is possible to predict that a negative check result to be diagnosed as a failure will not be obtained. Therefore, when it is possible to predict a negative check result will not be obtained, the reliability of failure diagnoses is not degraded even if the check is suspended. In view of this, the ECU 30 moves on to step S29, and the prohibition on switching of fuels is lifted. The CNG operation is then switched to a gasoline operation using gasoline. By carrying out the procedure of step S26, the ECU 30 functions as the check result predicting device according to the present invention. It should be noted that the ECU 30 determines whether the value of the miss fire counter C is increasing by examining the value of the miss fire counter C at predetermined intervals (at predetermined time or crank-angle intervals) and comparing the previous value and the value observed this time.

According to the first embodiment, the ECU 30 executes the control routine of FIG. 3, to prohibit switching of fuels basically after the start of the miss fire check. Accordingly, an inaccurate miss fire check due to a fuel switch during the miss fire check can be prevented, and an ill-timed suspension of the miss fire check can be prevented. Where it is possible to predict that a negative check result will be not obtained during the miss fire check, the prohibition on switching of fuels during the miss fire check is lifted (step S26 and step S29). Therefore, even if a request for switching of fuels is issued to the internal combustion engine 1 after the start of the miss fire check, the request is not totally ignored to complete the miss fire check. In this manner, some fuel switch requests can be satisfied while the reliability of failure diagnoses is ensured. Thus, the utility of the internal combustion engine 1 can be enhanced.

Second Embodiment

Figure 4:
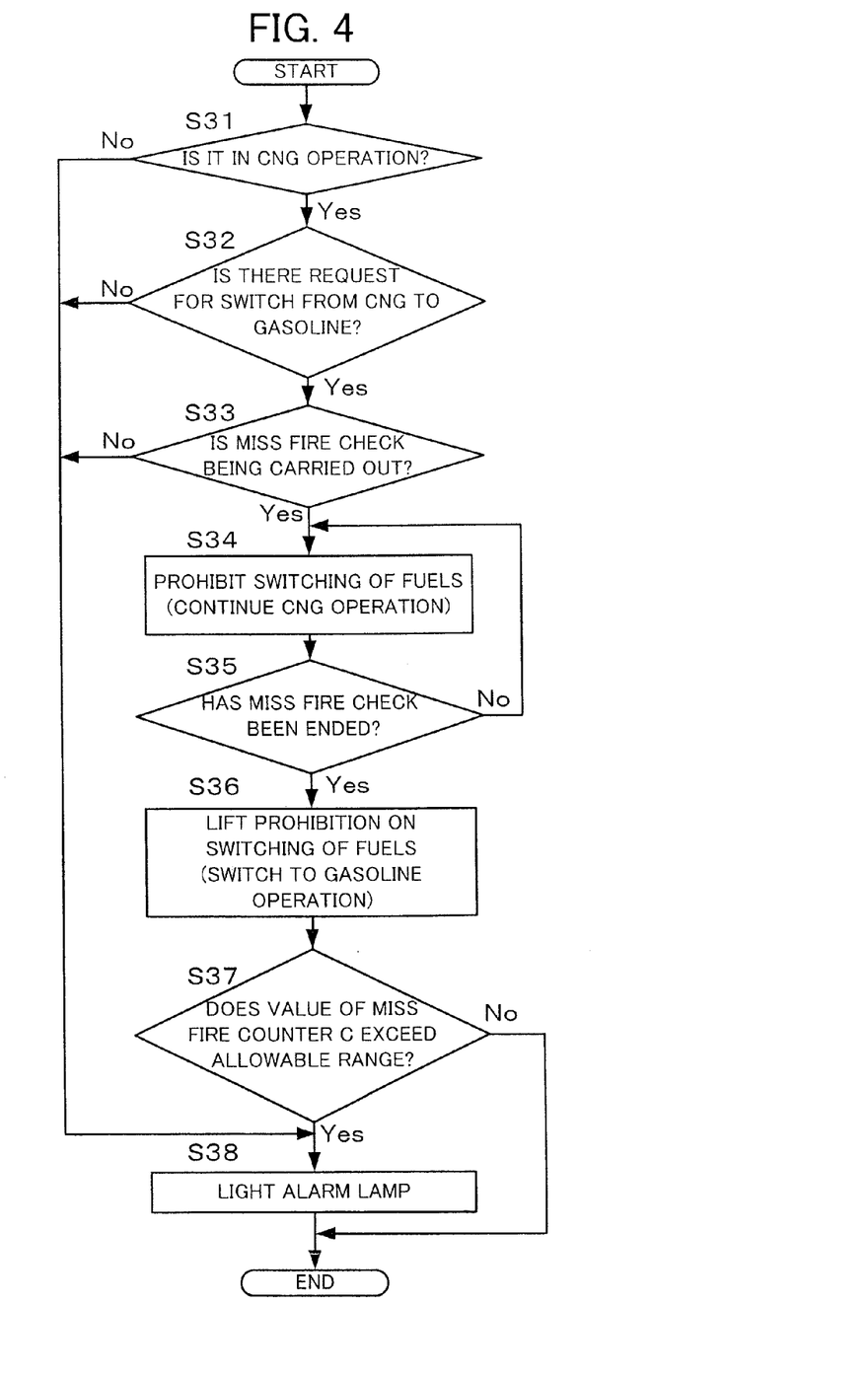
FIG. 4 is a flowchart showing an example of a control routine according to a second embodiment.

Referring now to FIG. 4, a second embodiment of the present invention is described. The second embodiment is the same as the first embodiment, except for the control routine shown in FIG. 4. Therefore, the physical structure of the second embodiment is shown in FIG. 1, and the specifics of the check are shown in FIG. 2. FIG. 4 is a flowchart showing an example of the control routine according to the second embodiment. The program of this control routine is stored in the ECU 30. The program is read out when needed, and is repeatedly executed at predetermined intervals. In this manner, the ECU 30 functions as the fuel switch prohibiting device according to the present invention.

As shown in FIG. 4, in step S31, the ECU 30 determines whether the internal combustion engine 1 is in the CNG operation. If the internal combustion engine 1 is in the CNG operation, the ECU 30 moves on to step S32. If the internal combustion engine 1 is not in the CNG operation, the ECU 30 moves on to step S37. In step S32, the ECU 30 determines whether there is a switch request to switch the fuel being used from CNG to gasoline. If there is the switch request, the ECU 30 moves on to step S33. If there is not the switch request, the ECU 30 moves on to step S37.

In step S33, the ECU 30 determines whether the miss fire check (see FIG. 2) is being carried out on the internal combustion engine 1. If the miss fire check is being carried out, the ECU 30 moves on to step S34, to control the internal combustion engine 1 so that a fuel switch from CNG to gasoline is prohibited. Accordingly, the CNG operation is continued. In step S35, the ECU 30 determines whether the miss fire check has been finished. If the miss fire check has not been finished yet, the ECU 30 returns to the procedure of step S34, to maintain the prohibition on switching of fuels. If the miss fire check has been finished, the ECU 30 moves on to step S36, and lifts the prohibition on switching of fuels. In this manner, the CNG operation is switched to the gasoline operation.

In step S37, the ECU 30 determines whether the value of the miss fire counter C exceeds the allowable range. If the value of the miss fire counter C exceeds the allowable range, the ECU 30 determines that a combustion failure has occurred due to a miss fire. The ECU 30 then moves on to step S38, to light the alarm lamp. This routine then comes to an end. If the value of the miss fire counter C does not exceed the allowable range, the ECU 30 skips step S38, and this routine comes to an end. By carrying out the procedure of step S37, the ECU 30 functions as the failure diagnosing device according to the present invention.

According to the second embodiment, once the miss fire check has started, switching of fuels is prohibited until the check comes to an end. Accordingly, the miss fire check can be certainly completed, and accurate check results can be obtained.

Third Embodiment

Figure 5:
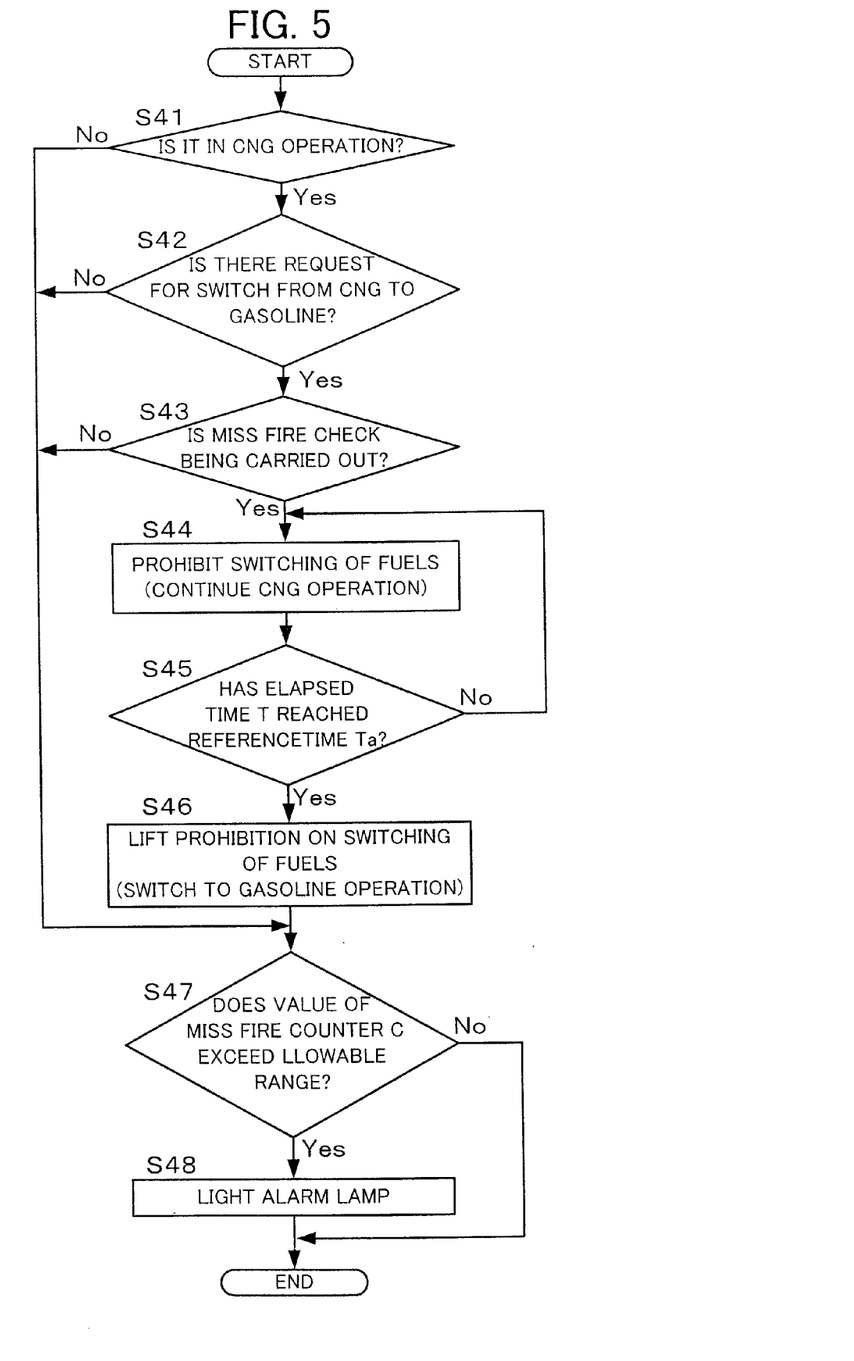
FIG. 5 is a flowchart showing an example of a control routine according to a third embodiment.

Referring now to FIG. 5, a third embodiment of the present invention is described. The third embodiment is the same as the first embodiment, except for the control routine shown in FIG. 5. Therefore, the physical structure of the third embodiment is shown in FIG. 1, and the specifics of the check are shown in FIG. 2. FIG. 5 is a flowchart showing an example of the control routine according to the third embodiment. The program of this control routine is stored in the ECU 30. The program is read out when needed, and is repeatedly executed at predetermined intervals. In this manner, the ECU 30 functions as the fuel switch prohibiting device according to the present invention.

As shown in FIG. 5, in step S41, the ECU 30 determines whether the internal combustion engine 1 is in the CNG operation. If the internal combustion engine 1 is in the CNG operation, the ECU 30 moves on to step S42. If the internal combustion engine 1 is not in the CNG operation, the ECU 30 moves on to step S47. In step S42, the ECU 30 determines whether there is a switch request to switch the fuel being used from CNG to gasoline. If there is the switch request, the ECU 30 moves on to step S43. If there is not the switch request, the ECU 30 moves on to step S47.

In step S43, the ECU 30 determines whether the miss fire check (see FIG. 2) is being carried out on the internal combustion engine 1. If the miss fire check is being carried out, the ECU 30 moves on to step S44, to control the internal combustion engine 1 so that a fuel switch from CNG to gasoline is prohibited. Accordingly, the CNG operation is continued. In step S45, the ECU 30 determines whether an elapsed time T since the start of the miss fire check reaches a reference time Ta. If the elapsed time T has not reached the reference time Ta, the ECU 30 returns to the procedure of step S44, to maintain the prohibition on switching of fuels. If the elapsed time T has reached the reference time Ta, the ECU 30 moves on to step S46, to lift the prohibition on switching of fuels. In this manner, the CNG operation is switched to the gasoline operation.

The reference time Ta used in step S45 is set in advance as a time in which the miss fire check can be completed. The checking period of the miss fire check is examined with respect to each operating state of the internal combustion engine 1 through simulations, actual machine tests, or the like, and the reference time Ta is set based on the results of the examination. It should be noted that the reference time Ta may be fixed. However, since the checking period varies with the operating state (particularly with the engine rotation speed) of the internal combustion engine 1, the reference time Ta may vary with the operating state of the internal combustion engine 1. In a case where the reference time Ta is varied as above, a prohibition on switching of fuels after the end of the check can be prevented, and excess limitations are not put on fuel switch requests. Accordingly, the utility of the internal combustion engine 1 is enhanced.

Step S47 and step S48 are the same as the equivalent steps in FIG. 4. That is, in step S47, the ECU 30 determines whether the value of the miss fire counter C exceeds the allowable range. If the value of the miss fire counter C exceeds the allowable range, the ECU 30 determines that a combustion failure has occurred due to a miss fire. The ECU 30 then moves on to step S48, to light the alarm lamp. This routine then comes to an end. If the value of the miss fire counter C does not exceed the allowable range, the ECU 30 skips step S48, and this routine comes to an end. By carrying out the procedure of step S47, the ECU 30 functions as the failure diagnosing device according to the present invention.

According to the third embodiment, the timing to lift the prohibition on switching of fuels is determined from the time in which the check can be completed. Accordingly, lifting of the prohibition on switching of fuels during the check can be easily prevented even if the end of the miss fire check is not detected. It should be noted that, as described above, the number of combustion cycles over which the miss fire check is carried out is determined in advance. In view of this, the routine shown in FIG. 5 may be modified as follows. Instead of step S45, the step of determining whether the number of combustion cycles counted after the start of the miss fire check has reached a reference value may be carried out. When the number of combustion cycles reaches the reference value, the prohibition on switching of fuels is lifted. This reference value is a value that is set beforehand as the number of combustion cycles over which the miss fire check is to be carried out. Accordingly, after the number of combustion cycles equivalent to the reference value have ended since the start of the miss fire check, the miss fire check can be completed. If the routine of FIG. 5 is modified as above, there is no need to set a reference value for each rotation speed of the internal combustion engine 1, and accordingly, the operations can be simplified.

Other Embodiments

The present invention is not limited to the above described embodiments, and various other embodiments can be formed within the scope of the invention. In each of the above described embodiments, switching the fuel from CNG to gasoline is prohibited during the miss fire check. However, in switching the fuel from gasoline to CNG, the same control operation as any one of the control operations of FIGS. 3 through 5 may be performed, or some different control operation may be performed. For example, while the control operation of FIG. 3 is performed in switching the fuel from CNG to gasoline, the control operation of FIG. 4 or 5 may be performed in switching the fuel from gasoline to CNG. By varying the conditions for lifting the prohibition on switching of fuels between the fuel switch directions, various conditions of each fuel such as the conditions of use and the frequency of use can be taken into consideration in putting limitations on the switching. Accordingly, it becomes possible to prevent excessive limitations on switching to a particular fuel, or prevent requests for switching to the particular fuel from often remaining unsatisfied, for example.

As is known, where a hydrocarbon gas fuel such as CNG is used as the fuel for an internal combustion engine, the amount of harmful components in the exhaust is smaller than that in a case where a hydrocarbon liquid fuel such as gasoline is used as the fuel for an internal combustion engine, but it is difficult to obtain the necessary output torque. Therefore, fuels are used separately from each other: a gas fuel is used only while the harmful components in the exhaust can be easily discharged or while the exhaust purification catalyst is not active, for example; during the periods other than that, a liquid fuel is used. As a result, the frequencies of use of those fuels differ from each other, depending on how each of those fuels is used. In each internal combustion engine 1 according to the above described embodiments, CNG and gasoline are used separately based on such criteria, and therefore, the frequency of use of CNG is lower than the frequency of use of gasoline. Even if the miss fire check can be thoroughly carried out while gasoline with the higher frequency of use is being used, the miss fire check might not be sufficiently carried out while CNG with the lower frequency of use is being used, since the miss fire check cannot often be carried out. To counter this problem, the control operation according to one of the above described embodiments can be performed only when the fuel is switched from CNG to gasoline. With this arrangement, an inaccurate miss fire check can be prevented while CNG is being used, and an ill-timed suspension of the check can be prevented and the reliability of failure diagnoses can be ensured. In a case where a request for switching the fuel from gasoline to CNG is issued after the miss fire check is started during a gasoline operation, the miss fire check can be suspended without a prohibition on the switching. Particularly, in the control operation of FIG. 3, excessive limitations are not put on requests to switch the fuel to gasoline, and accordingly, the utility of the internal combustion engine 1 is not degraded.

Checks according to the present invention include not only the miss fire check but also any checks that are carried out over two or more combustion cycles. As described above, an imbalance check for checking for variations of the combustion states of the respective cylinders 2, a degradation check to be carried out on the three-way catalyst 21, a failure check to be carried out on the oxygen density sensor 33, and the like are checks that are carried out over two or more combustion cycles. Accordingly, when any one of those checks is started, the internal combustion engine 1 can be controlled so that switching of fuels is prohibited after the start of the check, as in the case of the miss fire check.

Each of the above described embodiments concerns an internal combustion engine that switchably uses CNG as a gas fuel and gasoline as a liquid fuel. However, any fuels may be used, as long as those fuels of different kinds are switchably used. For example, the present invention can also be applied to an internal combustion engine that switchably uses gasoline as a liquid fuel and alcohol as a liquid fuel or a blended fuel of alcohol and gasoline. The present invention can also be applied to an internal combustion engine that switchably uses three or more kinds of fuels. It should be noted that embodiments of combustion cycles of internal combustion engines are not particularly limited, and the present invention can also be applied to a two-stroke, one-cycle internal combustion engine, for example.

The invention claimed is:

1. A control apparatus for an internal combustion engine, the control apparatus being used in the internal combustion engine that is capable of switchably using a plurality of kinds of fuels, the control apparatus comprising:
a checking portion programmed to carry out a check on the internal combustion engine over a plurality of combustion cycles;
a failure diagnosing portion programmed to detect a failure, based on a result of the check carried out by the checking portion; and
a fuel switch prohibiting portion programmed to control the internal combustion engine so that switching of fuels is prohibited after a start of the check; and
a check result predicting portion programmed to predict whether a negative check result to be diagnosed as the failure by the failure diagnosing portion will be obtained, based on a progress status of the check, after the start of the check,
wherein
the fuel switch prohibiting portion controls the internal combustion engine so that the prohibition on switching of fuels is lifted when the check result predicting portion predicts that the negative check result will not be obtained after the start of the check,
the checking portion is programmed to obtain a plurality of physical quantities related to failures to be checked for over the plurality of combustion cycles, and determines each of the obtained physical quantities to be a normal value or an abnormal value,
the failure diagnosing portion is programmed to detect the failure when the number of the abnormal values determined by the checking portion is programmed to exceed an allowable range, and
after the start of the check, the check result predicting portion is programmed to predict whether the negative check result will be obtained, based on a variation of the number of the abnormal values within the allowable range.

2. The control apparatus according to claim 1, wherein after the start of the check, the check result predicting portion is programmed to predict that the negative check result will not be obtained, when the number of the abnormal values stays within the allowable range and is not increasing.

3. The control apparatus according to claim 1, wherein, after the start of the check, the fuel switch prohibiting portion is programmed to control the internal combustion engine so that the prohibition on switching of fuels is lifted when the check is finished.

4. The control apparatus according to claim 1, wherein, after the start of the check, the fuel switch prohibiting portion is programmed to control the internal combustion engine so that the prohibition on switching of fuels is lifted when a period of time or combustion cycles in which the check can be completed has passed or have ended.

5. The control apparatus according to claim 1, wherein
the checking portion is programmed to carry out the check that is a miss fire check on the internal combustion engine over a plurality of combustion cycles, and
the failure diagnosing portion is programmed to detect the failure that is a combustion failure due to a miss fire.

6. The control apparatus according to claim 1, wherein the plurality of kinds of fuels include a hydrocarbon gas fuel and a hydrocarbon liquid fuel.

* * * * *